April 14, 1953 O. L. DUPY 2,635,218
DIRECT CURRENT MOTOR CONTROL
Filed Dec. 4, 1950 3 Sheets-Sheet 1

*INVENTOR.*
OLIN L. DUPY
BY
*ATTORNEY*

April 14, 1953     O. L. DUPY     2,635,218
DIRECT CURRENT MOTOR CONTROL
Filed Dec. 4, 1950     3 Sheets-Sheet 2
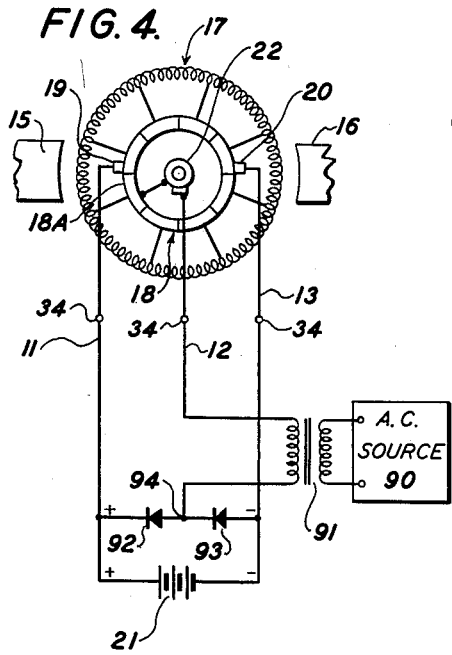
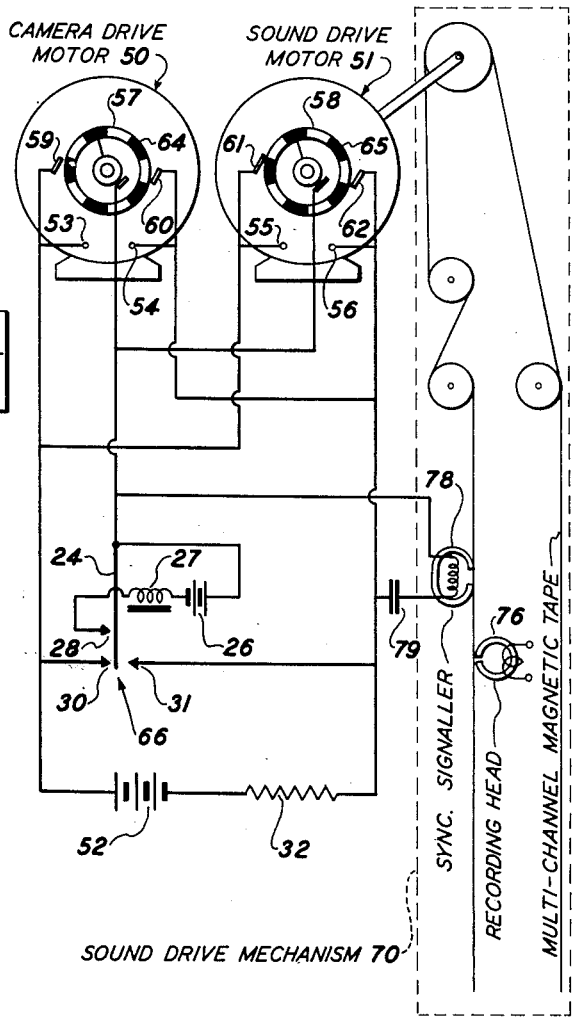
INVENTOR.
OLIN L. DUPY
BY
ATTORNEY April 14, 1953     O. L. DUPY     2,635,218
DIRECT CURRENT MOTOR CONTROL
Filed Dec. 4, 1950     3 Sheets-Sheet 3
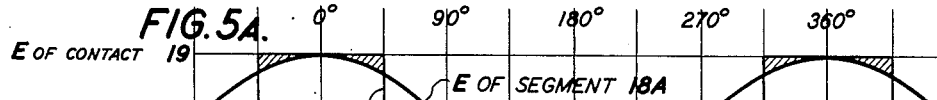
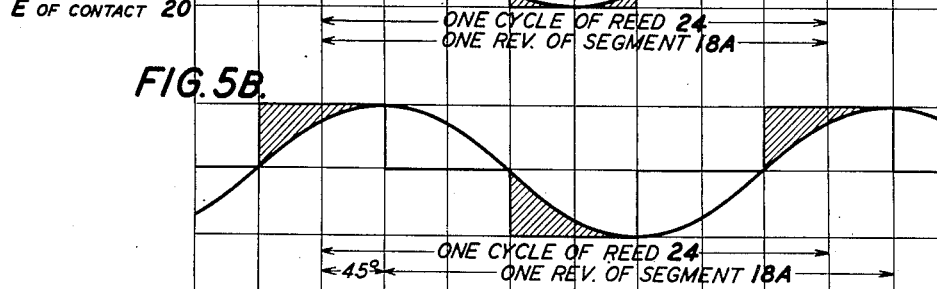
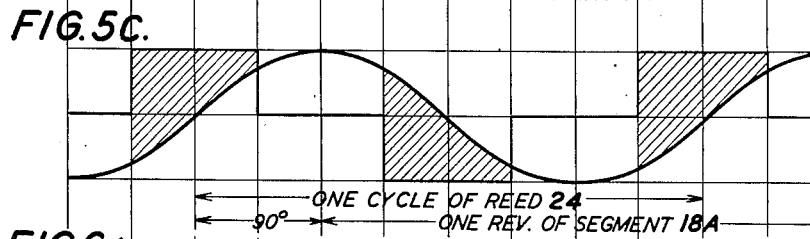
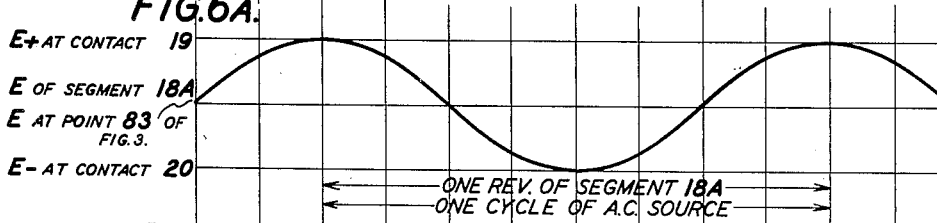
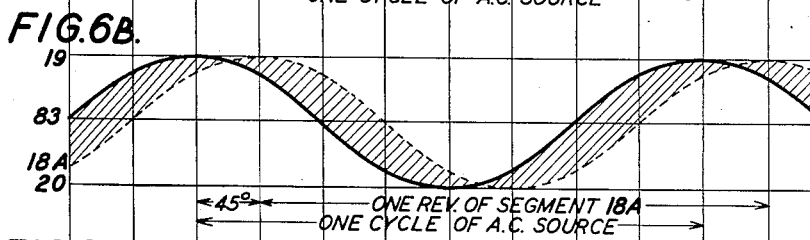
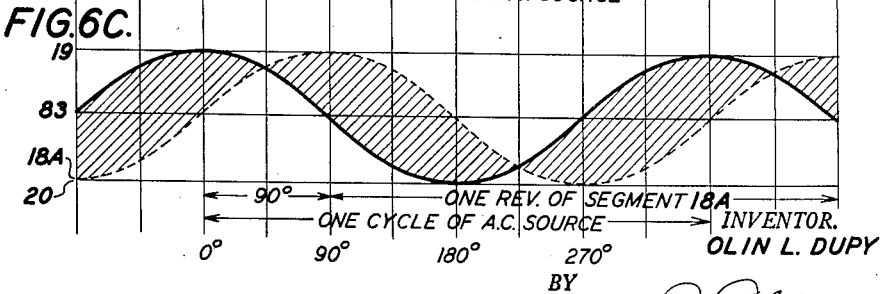
INVENTOR.
OLIN L. DUPY
BY
ATTORNEY Patented Apr. 14, 1953

2,635,218

UNITED STATES PATENT OFFICE 2,635,218

DIRECT CURRENT MOTOR CONTROL

Olin L. Dupy, Los Angeles, Calif.

Application December 4, 1950, Serial No. 199,008

23 Claims. (Cl. 318—82)

This invention is concerned with direct current motors and provides novel control means which requires such motors to run in synchronism with an alternating electrical current derived from any conventional source or with the periodic opening and closing of contacts of a vibrating reed or the like over a wide range of voltage and load changes.

The invention may be employed to drive a plurality of D. C. motors in step with each other or with other A. C. motors or apparatus.

It is convenient to energize a variety of equipment (such as portable cinema cameras, sound recording and reproducing apparatus, electric clocks in automobiles, etc.) with direct current from a battery, provided that the equipment can be made to run at constant speed. However, it has been difficult and expensive to obtain constant speed in such apparatus when employing a D. C. power source.

I have devised a new, reliable and inexpensive system for causing a direct current motor to run in synchronism with an alternating or pulsating impulse, which as indicated above, is conveniently induced by a set of make-and-break contacts actuated by a tuning fork or vibrating reed. The fork or reed may, in turn, be driven by direct current, so that the advantages of synchronous operation which accrue to alternating current motors, may be obtained without resort to an A. C. power source. However, the invention is not limited to the use of a pulsating impulse derived from a D. C. driven vibrator or the like, and if a suitable auxiliary source of alternating current is available this may be rectified and employed to "time" the revolution of a D. C. motor. Moreover, the invention is adapted to operate a plurality of direct current motors in synchronism with each other. By way of example, in making talking pictures, a D. C. drive motor for the camera and one for the sound recording apparatus may be driven in synchronism with each other and in synchronism with a pulsating impulse or alternating current, thus holding the system at constant speed. In reproducing the talking picture, D. C. drive motors for the picture film and the medium which carries the sound record may be connected to run in synchronism with each other and with an alternating current, say that available in the theater, home or studio.

The invention is applicable to any of the conventional D. C. motors, whether the field of the motor is created electromagnetically or by a permanent magnet, and whether or not the armature and field coil of the motor are connected in shunt, series or compound circuits.

In accordance with my invention, I provide a special electrical connection between the armature winding of an otherwise conventional D. C. motor, and a source of a periodic impulse, such that the armature is caused to rotate in synchronism with the period of an impulse as induced by periodic opening and closing of contacts connected to short a portion of the armature winding or by a cyclic change in a rectified alternating current. A point on the armature winding is continuously connected to the source of the impulse, the return for this current being through the commutator of the motor.

Conveniently the synchronizing impulse is applied to a point in the armature winding through the commutator or equivalent device connected to and rotatable with the armature winding. This commutator receives the principal power for rotation of the armature as direct current through conventional brushes or the like, but in addition at least one and less than all of the commutator segments is permanently connected to the source of the synchronizing impulse supplied by a vibrator or by a source of alternating current connected through a rectifier.

The motor to be regulated is set to rotate as an unaltered conventional D. C. motor at or above the desired synchronous speed. In other words, if the control of the invention were removed from the motor its speed of rotation would tend to remain the same or to increase rather than decrease. Then, as the vibrator which develops the synchronizing impulse alternately makes contact, a portion of the armature winding is short circuited. The current flowing in the short circuited portion of the winding produces a dynamic braking action, tending to retard the rotation of the armature. This braking action increases as a larger portion of the armature is short circuited, as when due to an increase in the source voltage or a reduction of the load the motor tends to run substantially ahead of the pulsating control impulse, and decreases as the condition reverses. Consequently, the braking action automatically increases as needed to hold the rotation of the motor in step with the control source and decreases when a lesser braking action is required.

In the preceding paragraph the action of the apparatus has been described with reference to the use of make-and-break contacts to supply the pulsating current. The same result, however, is obtained if the synchronizing impulse is produced from an A. C. source by means of suitable rectification.

The connection for applying the synchronizing impulse to the variable portion of the armature winding may be made in various ways, but I prefer to make it through a brush riding on a slip ring mounted on the motor shaft and rotatable therewith, the slip ring being permanently connected to one of the commutator segments, which in turn is connected to the armature winding.

These and other aspects of my invention will be thoroughly understood in the light of the following detailed description and the accompanying drawing in which:

Fig. 4 illustrates a modification of the apparatus of Fig. 1;

Figs. 5A, 5B and 5C are graphs of voltage against time and illustrate the braking action obtained with the apparatus of Figs. 1 and 2;

Figs. 6A, 6B and 6C are graphs of voltage against time for illustrating the dynamic braking action of the apparatus of Figs. 3 and 4; and Fig. 7 is a schematic wiring diagram of a synchronized talking picture camera drive constructed in accordance with my invention.

Figure 1:
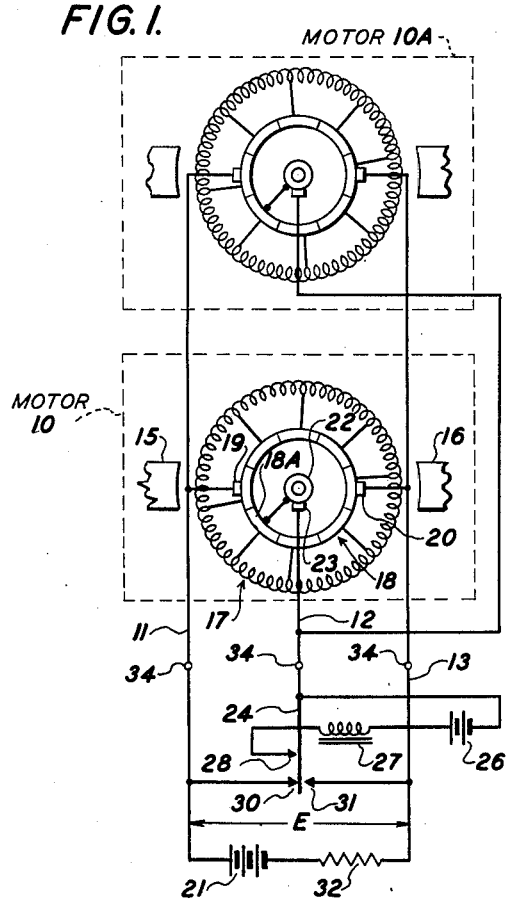
Fig. 1 is a simplified wiring diagram illustrating one form of the apparatus of the invention incorporating a D. C. driven vibrator.

Fig. 1 shows a D. C. motor 10 provided with the usual field poles 15, 16 (which may be either a permanent or an electromagnet) and an armature 17 disposed between them. The armature is provided with a conventional winding, conventionally connected to a commutator 18. The latter is provided with a plurality of insulated segments, each of which is connected to a corresponding point of the armature winding. The commutator has conventional brushes 19, 20 disposed opposite each other and connected to a D. C. power source 21 such as a battery, the voltage across the source being designated by E. Thus far the structure is purely conventional.

A slip ring 22 is keyed to the same shaft as the commutator to rotate therewith. It is permanently connected to one commutator segment 18A and to a point on the armature coil through this segment. A third brush 23 rides on the slip ring.

The apparatus is provided with a conductive magnetizable vibrating reed 24 which is tuned to the desired frequency and is driven by a conventional D. C. coil and contact system comprising an auxiliary D. C. source 23 connected in series with an electromagnet 27 and a make-and-break contactor 28. The reed is firmly fastened remote from the make-and-break contactor and is conductive. Its anchor end is connected to the third brush and it vibrates between a pair of contacts 30, 31 that are connected respectively to the main brushes. Thus the reed is connected to the third brush on the slip ring by a lead 12; the main brush 19 is connected to the contact 30 through the lead 11; and the other main brush 20 is connected to the other contact 31 through the lead 13.

A non-linear resistance or ballast 32 is disposed in series with the main D. C. source 21 and the two main brushes, its characteristics being such that it reduces the current drawn from the source as voltage increases. This is a desirable, but not an essential feature of the invention.

As shown in Fig. 1, a second motor 10A, identical with the first, may be connected in parallel with it across the vibrator and the main power source, in which case both motors will be synchronized with each other and the synchronizing impulse provided by the vibrator. The motors are illustrated as connected to the power and synchronizing circuit through a set of terminals 34 indicative of the interchangeable feature of the motors and synchronizing circuits.

In the operation of the apparatus of Fig. 1, the armature receives its energy through the commutator and accordingly tends to rotate as in conventional D. C. motors. This tendency is regulated by periodically short circuiting a portion of the armature winding, this portion being variable and dependent upon the position of the commutator segment 18A with respect to the two main brushes. The effect of introducing this short circuit in this fashion is similar to that which would be achieved if the main brushes were periodically expanded and contracted to short out more or less of the armature, the net result being a regulated braking action which keeps the armature rotating in synchronism with the vibrator. The effect will be clearly understood in the light of the explanatory diagrams 5A, 5B, 5C which are plots of voltage against time for three different situations encountered in the operation of the apparatus of Fig. 1.

In considering the diagram it should be remembered that the speed of rotation of the motor 10 has been set at or above the desired synchronous speed. In other words, if the lead 12 were to be disconnected from the reed 24 the speed of the armature would not tend to decrease. As the reed 24 alternately makes contact with contacts 30 and 31, a portion of the armature winding is short circuited, and current flowing through this short circuited portion of the winding produces a dynamic braking action, tending to retard the rotation of the armature. The amount of current that flows depends upon the voltage that exists between commutator bar or segment 18A and the particular contact 30 or 31) that the tuned reed 24 is engaged with at that instant. The voltage that appears across the commutator bar 18A and either contact 30 or 31 depends upon the angular displacement between the bar 18A as it revolves through revolution and the reed as it vibrates through one cycle.

In the situation illustrated in Fig. 5A the motor is running in synchronism with the reed, one cycle of reed vibration corresponding to one revolution of the motor or 360°. The dynamic braking action is indicated by the shaded portions between the curves, one of which is a plot of instantaneous voltage on the short circuited commutator segment 18A and the other a plot of like voltage on the brush contacts 19 and 20. It will be seen that the braking action is very slight, as would be expected when the motor is rotating in synchronism with the vibration of the reed.

A more aggravated situation is shown in Fig. 5B in which the motor is running 45° ahead of the reed. Here, as shown by the shaded portions, the dynamic braking action is much greater, and the force exerted to hold in synchronism with the reed is correspondingly larger.

A situation in which the braking action is still larger is shown in Fig. 5C where voltage E is high or the load is light and the necessary braking action to hold the motor in synchronous occurs when the armature rotation leads the vibrating reed by a phase angle of 90°.

The operating range of the motor is anywhere between conditions shown in Figs. 5A and 5C. The amount of the lead of the motor over the reed depends on the supply voltage and the load on the motor.

Fig. 7 illustrates an application of the invention to an operation in which a cinema camera and a sound recorder are driven in synchronism with each other, so as to record the sound on a magnetic tape in synchronism with the pictures taken by the camera. In the apparatus of Fig. 7 a camera drive motor 50 and a sound drive motor 51 are of the D. C. type. Power to drive both motors is supplied from a direct current source 52. The two motors are connected in parallel with this source. Shunted field windings (not shown) of the two motors may be connected across the D. C. source through contacts 53, 54 in one case and 55, 56 in the other. Preferably, however, the field in each motor is supplied by a permanent magnet, likewise not shown. The motors are provided with commutators 57, 58 constructed as described in connection with Fig. 1. The commutators are respectively energized with direct current through main brushes 59, 60, 61, 62. The commutators are thus connected in shunt with the field coils of their respective motors (if field coils are employed).

Both motors have armatures (not shown) which are keyed to and rotatable with the commutators and connected thereto as shown in Fig. 1. One commutator segment of each motor is connected to a slip ring 64, 65 on the motor shaft and is connected to a vibrator 66 connected to the circuit precisely as the vibrator of Fig. 1 and containing the same elements, including an auxiliary D. C. source 26 for energizing the vibrator. The synchronizing impulse developed by the vibrator is connected across one segment of the commutator and the armature of each motor. Since the same periodic braking action is impressed upon both motors, the motors will tend to rotate in synchronism with each other, as desired.

The "sound drive" motor 51 is connected to a conventional mechanism 70 which pulls a magnetic tape 71 past a recording head 76. The latter conveniently is the multi-channel recording head described and claimed in my co-pending application Serial No. 160,530, filed May 6, 1950.

To assure matching of the finished tape with the finished film from the camera, it is sometimes desirable to impress a "sync" signal on a second channel on the tape during the recording operation. This is accomplished by an electromagnet 73 disposed near the tape in magnetic relationship therewith and adjacent the recording head. This magnet is connected between the lead which receives current from the slip rings of the motors and one side of the main D. C. circuit, a condenser 79 being placed in series with the magnet coil to prevent D. C. flow.

When the equipment is in operation, the recording head will impress the sound signal on one channel on the tape. A "sync" signal will be impressed on another channel on the tape by the magnet. After both sound and picture have been obtained, the two are matched by means of the "sync" signal.

Figure 2:
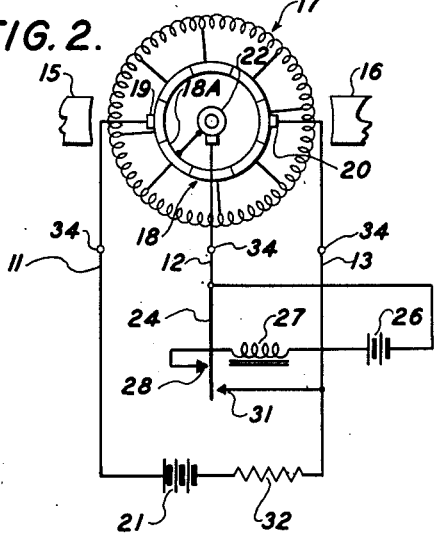
Fig. 2 is a diagram illustrating a modification of the apparatus of Fig. 1.

The apparatus of Fig. 2 is similar to that of Fig. 1, like parts being designated by like reference characters. However, in the apparatus of Fig. 2 only one motor is provided, although a plurality may be connected in parallel with equal facility, and the vibrator hook-up is simplified by the elimination of the contact 30. The remaining contact 31 operates as in the apparatus of Fig. 1 to develop a synchronizing impulse once for each revolution of the motor. Since contact 30 is eliminated the close period of contact 31 may be increased with the result that the total braking action is in excess of half that provided in the Fig. 1 apparatus.

Figure 3:
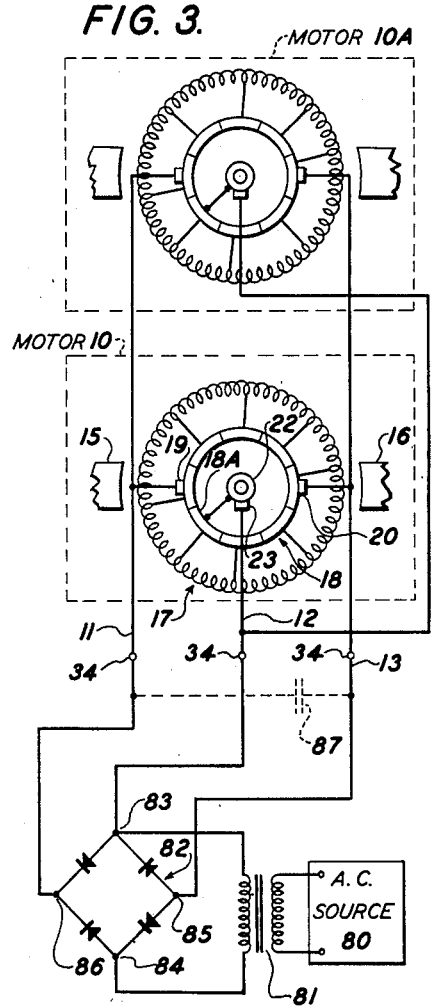
Fig. 3 is a simplified wiring diagram illustrating another form of the apparatus of the invention employing an A. C. source and a rectifier.

The apparatus of Fig. 3 is the same as that of Fig. 1, in having two motors with the control of the invention connected to both so that they will run in synchronism with each other. However, the synchronizing impulse in this embodiment is derived from an alternating current source 80 instead of from a vibrator. The A. C. source is connected into the motor circuit through a transformer 81 and a conventional bridge rectifier 82. Thus opposite corners 83, 84 of the bridge are connected to the secondary of the transformer, the other pair of corners 85, 86 being connected across the armature by means of leads 11 and 13. One of the corners 83 of the first pair is connected to the commutator segment 18A through the center lead 12, the brush 23, and the slip ring 22. The opposite corner 84 can in the alternative be connected in the same manner.

A unidirectional sinusoidal pulsating current is produced at the bridge corner 83 as a result of the action of the bridge rectifier, and this current is impressed on the commutator. Fig. 3, therefore shows a true A. C. synchronous motor combined with a D. C. motor. Power for rotating the armature may be derived either from the A. C. source, as shown, or from an independent D. C. source (not shown).

If desired, a capacitor 87, shown in dotted lines, may be connected across the commutator for filtering purposes, although this is optional.

The apparatus of Fig. 4 is the same as that of Fig. 2, like parts being designated by like reference characters, save that the vibrating reed of Fig. 2 and its D. C. driver have been replaced by an alternating current source 90, which is connected into the control circuit through a transformer 91 and a pair of half wave rectifiers 92, 93. Thus one side of the secondary of the transformer is connected to the commutator segment 18A through the lead 12. The other side of the secondary is connected to a common terminal 94 between the two rectifiers, the opposite sides of which are connected respectively to opposite sides of the commutator through the leads 11, 13.

A pulsating rectified current is produced at the common point 94 and transmitted to the commutator segment 18A as in the case of the apparatus of Fig. 3 with like results in synchronizing the rotation of the motor with the cyclic change of the A. C. source.

It should be noted that in the apparatus of Fig. 4 the ballast resistor 32 in series with the main D. C. source (Fig. 1) has been eliminated because it is unnecessary.

Figs. 6A, 6B, 6C illustrate the dynamic braking action which comes into play as the motors of Figs. 3 and 4 shift their relative lead in respect to the phase of the A. C. source. The amount of lead depends on the supply voltage and the load of the motor. These figures are similar respectively to Figs. 5A, 5B, 5C except that the synchronizing impulse (in this case a "short") induced by the reed 24 has been replaced by the rectified sinusoidal electromotive force which is impressed in its place in the apparatus of Figs. 3 and 4. Thus, in Fig. 6A, which illustrates the situation where the motor is in phase with the A. C. source, no braking action is applied. In Fig. 6B, however, the motor is 45° ahead of the source, and the braking force applied is shown by the shaded portions between the respective curves. In Fig. 6C, the two are still farther out of phase, in that the motor leads the source by 90°, with consequent further increase in the dynamic braking action.

If the two motors of either Figs. 1 or 3 are aligned brush-wise at standstill (as shown), they will accelerate in synchronism with each other and hold together during starting. This is an important advantage in a variety of applications, for example, in a "dubbing job" in motion picture photograph where a silent film is first prepared and re-run during the recording of a sound track which must be synchronized with it, the silent film being projected during the recording by the sound track, with the drives of the projector and the sound recorder being tied together in accordance with the invention.

I claim:

1. In a direct current motor having a commutator with a plurality of segments connected to its armature winding and first and second commutator contacts for connecting opposite sides of the commutator to opposite sides of a direct current source, the combination which comprises two external contacts connected respectively to said first and second commutator contacts, a movable conductor disposed between the two external contacts, means for vibrating the conductor so that it alternately makes contact with said two external contacts, and means electrically connecting the conductor continuously to a segment of the commutator.

2. In a direct current motor having a commutator with a plurality of segments connected to its armature winding and first and second commutator contacts for connecting opposite sides of the commutator to opposite sides of a direct current source, the combination which comprises two external contacts connected respectively to said first and second contacts, a movable conductor member disposed between the two external contacts, a reed on which the conductor is mounted, means for vibrating the reed so that the conductor alternately makes contact with said two external contacts, and means electrically connecting the conductor continuously to a segment of the commutator.

3. In a direct current motor with an armature winding energized through a commutator having a plurality of segments insulated from each other and rotatable with the armature, one side of the commutator being connected to the positive side of a direct current source and the other side of the commutator being connected to the negative side of the direct current source, the combination which comprises contacts connected respectively to the positive and negative sides of the direct current source, a conductive member disposed between the contacts and connected continuously to a segment, and means for vibrating the member between the contacts.

4. In a direct current motor with an armature winding energized through a commutator having a plurality of segments insulated from each other and rotatable with the armature, one side of the commutator being connected to the positive side of a direct current source and the other side of the commutator being connected to the negative side of the direct current source, the combination which comprises contacts connected respectively to the positive and negative sides of the direct current source, a conductive member disposed between the contacts and connected continuously to a segment, and means energized by direct current for vibrating the member between the contacts.

5. In a direct current motor with an armature winding energized through a commutator having a plurality of segments insulated from each other and rotatable with the armature, one side of the commutator being connected to the positive side of a direct current source and the other side of the commutator being connected to the negative side of the direct current source, the combination which comprises contacts connected respectively to the positive and negative sides of the direct current source, a conductive member disposed between the contacts and connected continuously to a segment, and means energized by said direct current for vibrating the member between the contacts.

6. In a direct current motor with an armature winding energized through a commutator with a plurality of segments insulated from each other and rotatable with the armature, one side of the commutator being connected to the positive side of a direct current source and the other side of the commutator being connected to the negative side of the direct current source, the combination which comprises contacts connected respectively to the positive and negative sides of the direct current source, a conductive member disposed between the contacts and connected continuously to a segment, and means energized by direct current for vibrating the member between the contacts and comprising an electromagnet and a make-and-break contact and a magnetizable element disposed between them.

7. In a direct current motor with an armature winding energized through a commutator having a plurality of segments insulated from each other and rotatable with the armature, one side of the commutator being connected to the positive side of a direct current source and the other side of the commutator being connected to the negative side of the direct current source, the combination which comprises contacts connected respectively to the positive and negative sides of the direct current source, a conductive member disposed between the contacts and connected continuously to a segment, and means for vibrating the member between the contacts comprising a vibrating magnetizable reed carrying the conductive member, and a make-and-break contact and a solenoid between which the reed is disposed.

8. In a direct current motor with an armature winding energized through a commutator having a plurality of segments insulated from each other and rotatable with the armature, the commutator being brush-connected between the positive and negative sides of a direct current source, the combination which comprises contacts connected respectively to the positive and negative sides of the source, a conductor disposed between the contacts and connected continuously to a commutator segment, and means for vibrating the conductor alternately into contact with the contacts.

9. In a direct current motor with an armature winding energized through a commutator having a plurality of segments insulated from each other and rotatable with the armature, the commutator being brush-connected between the positive and negative sides of a direct current source, the combination which comprises contacts connected respectively to the positive and negative sides of the source, a conductor disposed between the contacts and connected continuously to a commutator segment, means for vibrating the conductor alternately into contact with the contacts, and a shunt circuit for tapping off alternating current comprising a condenser connected between the conductor and one of the sides of the direct current source.

10. In a direct current motor with an armature winding energized through a commutator having a plurality of segments insulated from each other and rotatable with the armature, the commutator being brush-connected between the positive and negative sides of a direct current source, the combination which comprises contacts connected respectively to the positive and negative sides of the source, a conductor disposed between the contacts and connected continuously to a commutator segment, and means for vibrating the conductor alternately into contact with the contacts, and a shunt circuit for tapping off alternating current comprising a transformer primary coil and a condenser in series with it, the two being connected between the conductor and one of the sides of the direct current source.

11. In a system containing a plurality of direct current motors each with an armature winding energized through a commutator having a plurality of segments insulated from each other and rotatable with the armature, the commutator being brush-connected between the positive and negative sides of a direct current source, the combination which comprises contacts connected respectively to the positive and negative sides of the source, a conductor disposed between the contacts and connected continuously to a commutator segment in each motor, and means for vibrating the conductor alternately into contact with the contacts.

12. In a system for simultaneous cinema photography and sound recording provided with two direct current motors each with an armature winding energized through a commutator having a plurality of segments insulated from each other and rotatable with the armature, the commutator in each case being brush-connected between the positive and negative sides of a direct current source, and also provided with a magnetizable tape driven by one of the motors the combination which comprises contacts connected respectively to the positive and negative sides of the source, a conductor disposed between the contacts and connected continuously to a commutator segment in each motor, means for vibrating the conductor alternately into contact with the contacts, means for tapping off alternating current from the conductor, and an electromagnet disposed adjacent the tape and energized by the alternating current tapped off.

13. In a direct current motor having an armature winding and a commutator connected thereto with a plurality of brushes contacting the commutator, the combination which comprises a source of pulsating current, means continuously connecting a point on the armature winding to one side of the source, and means connecting the other side of the source to at least one of the brushes on the commutator.

14. In a direct current motor having an armature winding and a commutator connected thereto with a plurality of brushes contacting the commutator, the combination which comprises a vibrator which produces a pulsating impulse, means for continuously connecting the pulsating impulse to a point on the armature winding, the circuit for the pulsating impulse from the vibrator to the armature winding being completed through the brushes on the commutator.

15. In a direct current motor having an armature winding and a commutator connected therewith at a plurality of points around its periphery with a plurality of brushes contacting the commutator, the combination which comprises a source of rectified alternating current and means for continuously supplying this current to a point on the armature winding, the circuit for this current being completed through the brushes on the commutator.

16. In apparatus including a plurality of direct current motors connected in parallel and each having armature windings and commutators connected thereto with a plurality of brushes contacting the respective commutators, the combination which comprises a source of uniformly periodic impulses, means continuously connecting points on the respective armature windings in parallel with each other to one side of the source, and means connecting the other side of the source to the brushes on the respective commutators in parallel.

17. Apparatus according to claim 16 in which the source of periodic impulses is a vibrator.

18. Apparatus according to claim 16 in which the impulses are rectified alternating current.

19. Apparatus according to claim 16 in which the source of impulses is a bridge rectifier energized by alternating current.

20. In a direct current motor having a commutator with a plurality of segments connected to its armature winding and a plurality of brushes for contacting the segments, and means for connecting one side of the commutator to one side of a source of unidirectional current and the other side of the commutator to the other side of said source, the combination comprising a source of uniformly periodic impulses, and means electrically connecting one side of said source of impulses to a segment of the commutator, and means electrically connecting the other side of said source through the brushes to the commutator.

21. In a direct current motor having an armature winding, a commutator with a plurality of segments respectively connected to spaced points on the armature winding, and a plurality of brushes contacting the commutator, the combination comprising conductive means connected to one of the segments of the commutator, and electrical means connected between said conductive means and the brushes on the commutator for periodically causing an electric current to flow through the portions of the armature winding which are connected between said segment of the commutator and the brushes.

22. In a direct current motor having an armature winding, a commutator with a plurality of segments respectively connected to spaced points on the armature winding, and a plurality of brushes contacting the commutator, the combination comprising conductive means connected to one of the segments of the commutator, and electrical means connected between said conductive means and one of the brushes on the commutator for periodically causing an electric current to flow through portions of the armature winding which are connected between said segment of the commutator and said brush.

23. In a direct current motor having an armature winding and a commutator connected thereto with a pair of brushes contacting the commutator, the combination which comprises a source of alternating current, means continuously connecting a point on the armature winding to one side of the source and a pair of unidirectional conductors respectively coupling the other side of the source to the respective brushes, the unidirectional conductors respectively coupling the other side of the source to the respective brushes, the unidirectional conductors being connected in opposite polarity.

OLIN L. DUPY.

References Cited in the file of this patent

UNITED STATES PATENTS

| Number | Name | Date |
|---|---|---|
| 702,454 | Miner | June 17, 1902 |
| 1,506,765 | Merrill | Sept. 2, 1924 |
| 1,753,331 | Clokey | Apr. 8, 1930 |
| 2,422,147 | Tornquist | June 10, 1947 |

FOREIGN PATENTS

| Number | Country | Date |
|---|---|---|
| 16,198 | Great Britain | of 1913 |